US012362653B2

United States Patent
Tanaka

(10) Patent No.: US 12,362,653 B2
(45) Date of Patent: Jul. 15, 2025

(54) SWITCHING CONTROL CIRCUIT, POWER SUPPLY CIRCUIT

(71) Applicant: FUJI ELECTRIC CO., LTD., Kawasaki (JP)

(72) Inventor: Kiminori Tanaka, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 285 days.

(21) Appl. No.: 18/087,895

(22) Filed: Dec. 23, 2022

(65) Prior Publication Data

US 2023/0253872 A1    Aug. 10, 2023

(30) Foreign Application Priority Data

Feb. 8, 2022    (JP) ................................. 2022-017874

(51) Int. Cl.
*H02M 1/08* (2006.01)
*H02M 1/088* (2006.01)
*H02M 3/335* (2006.01)

(52) U.S. Cl.
CPC ....... *H02M 1/088* (2013.01); *H02M 3/33569* (2013.01)

(58) Field of Classification Search
CPC .......................... H02M 3/33569; H02M 1/008
See application file for complete search history.

(56) References Cited

U.S. PATENT DOCUMENTS

| 8,452,025 | B2* | 5/2013 | Choi | ......................... H03F 1/30 381/74 |
| 10,148,188 | B2* | 12/2018 | Koo | .................. H02M 3/33523 |
| 2005/0088161 | A1* | 4/2005 | Balakrishnan | ........ H02M 3/156 323/284 |
| 2011/0085356 | A1* | 4/2011 | Morota | ............. H02M 3/33507 363/21.04 |
| 2012/0134707 | A1* | 5/2012 | Inukai | .................... G03G 15/80 363/21.17 |
| 2013/0077350 | A1* | 3/2013 | Mao | .................. H02M 3/33523 363/16 |

(Continued)

FOREIGN PATENT DOCUMENTS

| JP | 2000115998 A | 4/2000 |
| JP | 2001086742 A | 3/2001 |

(Continued)

*Primary Examiner* — Sisay G Tiku
(74) *Attorney, Agent, or Firm* — Rabin & Berdo, P.C.

(57) ABSTRACT

A switching control circuit for a power supply circuit including a first coil, a second coil configured to generate a voltage corresponding to a current flowing through the first coil, and a switching device configured to control the current flowing through the first coil. The switching control circuit controls switching of the switching device, and includes: a drive signal generator circuit configured to generate a driving signal, based on a feedback voltage corresponding to the output voltage; a driver circuit configured to switch the switching device, in response to the driving signal; a regulator configured to generate a power supply voltage of a target level to operate the driver circuit, and a drive current of the driver circuit; and a control circuit configured to control the regulator to decrease the drive current in response to the drive current reaching a predetermined value.

9 Claims, 9 Drawing Sheets

(56) References Cited

U.S. PATENT DOCUMENTS

| | | | | |
|---|---|---|---|---|
| 2014/0313792 A1* | 10/2014 | Nate | ................. | H02M 3/33523 |
| | | | | 363/21.15 |
| 2016/0164425 A1* | 6/2016 | Chen | ................. | H02M 3/33553 |
| | | | | 363/21.07 |
| 2017/0110974 A1* | 4/2017 | Chen | ....................... | H02M 1/08 |
| 2017/0155333 A1* | 6/2017 | Chen | ................. | H02M 3/33553 |
| 2017/0237356 A1* | 8/2017 | Chen | ................. | H02M 3/33553 |
| | | | | 363/21.02 |
| 2018/0069480 A1* | 3/2018 | Koo | ................. | H02M 3/33523 |
| 2021/0242766 A1* | 8/2021 | Sugawara | ............. | H02M 3/335 |
| 2024/0322814 A1* | 9/2024 | Pulvirenti | .......... | H03K 17/6877 |

FOREIGN PATENT DOCUMENTS

| | | | |
|---|---|---|---|
| JP | 2007122156 A | * | 5/2007 |
| JP | 2010273432 A | | 12/2010 |
| JP | 2012120316 A | | 6/2012 |
| JP | 2014138458 A | | 7/2014 |
| JP | 2018191391 A | | 11/2018 |
| JP | 2019088136 A | | 6/2019 |
| JP | 2021125941 A | | 8/2021 |

* cited by examiner

SWITCHING CONTROL CIRCUIT, POWER SUPPLY CIRCUIT

CROSS-REFERENCE TO RELATED APPLICATION

The present application claims priority pursuant to 35 U.S.C. § 119 from Japanese patent application number 2022-017874 filed on Feb. 8, 2022, the entire disclosure of which is hereby incorporated by reference herein.

BACKGROUND

Technical Field

The present disclosure relates to a switching control circuit and a power supply circuit.

Description of the Related Art

Power supply circuits may include a coil, an auxiliary coil electromagnetically coupled to the coil, a switching device for controlling the current flowing through the coil, and a switching control circuit for switching the switching device. Further, such switching control circuits may be operated with a power supply voltage that is generated from the voltage generated at the auxiliary coil according to the current flowing through the coil (for example, Japanese Patent Application Publication Nos. 2000-115998, 2001-086742, 2010-273432, 2012-120316, 2014-138458, 2018-191391, 2019-088136, and 2021-125941).

When the switching control circuit is configured with a module, the above power supply voltage may be generated by a regulator outside the module receiving the voltage at the auxiliary coil. In general, providing a regulator outside may increase the number of components configuring a power supply circuit, which may increase the cost of the power supply circuit. Thus, the regulator may be provided inside the module. However, providing the regulator inside the module may cause heat generation of the module when the output current of the regulator increases.

SUMMARY

A first aspect of an embodiment of the present disclosure is a switching control circuit for a switching power supply circuit, the switching power supply circuit being configured to generate an output voltage from an input voltage thereof, the switching power supply circuit including a first coil, a second coil configured to generate a voltage corresponding to a first current flowing through the first coil, a first switching device configured to control the first current flowing through the first coil, and a first capacitor configured to be charged with a second current from the second coil, to thereby generate a first power supply voltage, the switching control circuit being configured to control switching of the first switching device, the switching control circuit comprising: a drive signal generator circuit configured to generate a driving signal, based on a feedback voltage corresponding to the output voltage; a first driver circuit configured to switch the first switching device, in response to the driving signal; a regulator configured to generate a second power supply voltage of a target level to operate the first driver circuit, using the first power supply voltage, and a drive current of the first driver circuit; and a control circuit configured to control the regulator to decrease the drive current in response to the drive current reaching a first predetermined value.

A second aspect of an embodiment of the present disclosure is a switching power supply circuit configured to generate an output voltage from an input voltage thereof, the switching power supply circuit comprising: a first coil; a second coil configured to generate a voltage corresponding to a first current flowing through the first coil; and a switching device configured to control the first current flowing through the first coil; a capacitor configured to be charged with a second current from the second coil, to thereby generate a first power supply voltage; and a switching control circuit configured to control switching of the switching device, the switching control circuit including a drive signal generator circuit configured to generate a driving signal, based on a feedback voltage corresponding to the output voltage, a driver circuit configured to switch the switching device, in response to the driving signal, a regulator configured to generate a second power supply voltage of a target level to operate the driver circuit, using the first power supply voltage, and a drive current of the driver circuit, and a control circuit configured to control the regulator to decrease the drive current in response to the drive current reaching a predetermined value.

DETAILED DESCRIPTION

At least following matters will become apparent from the descriptions of the present specification and the accompanying drawings.

Embodiments

Overview of Switching Power Supply Circuit 10

Figure 1:
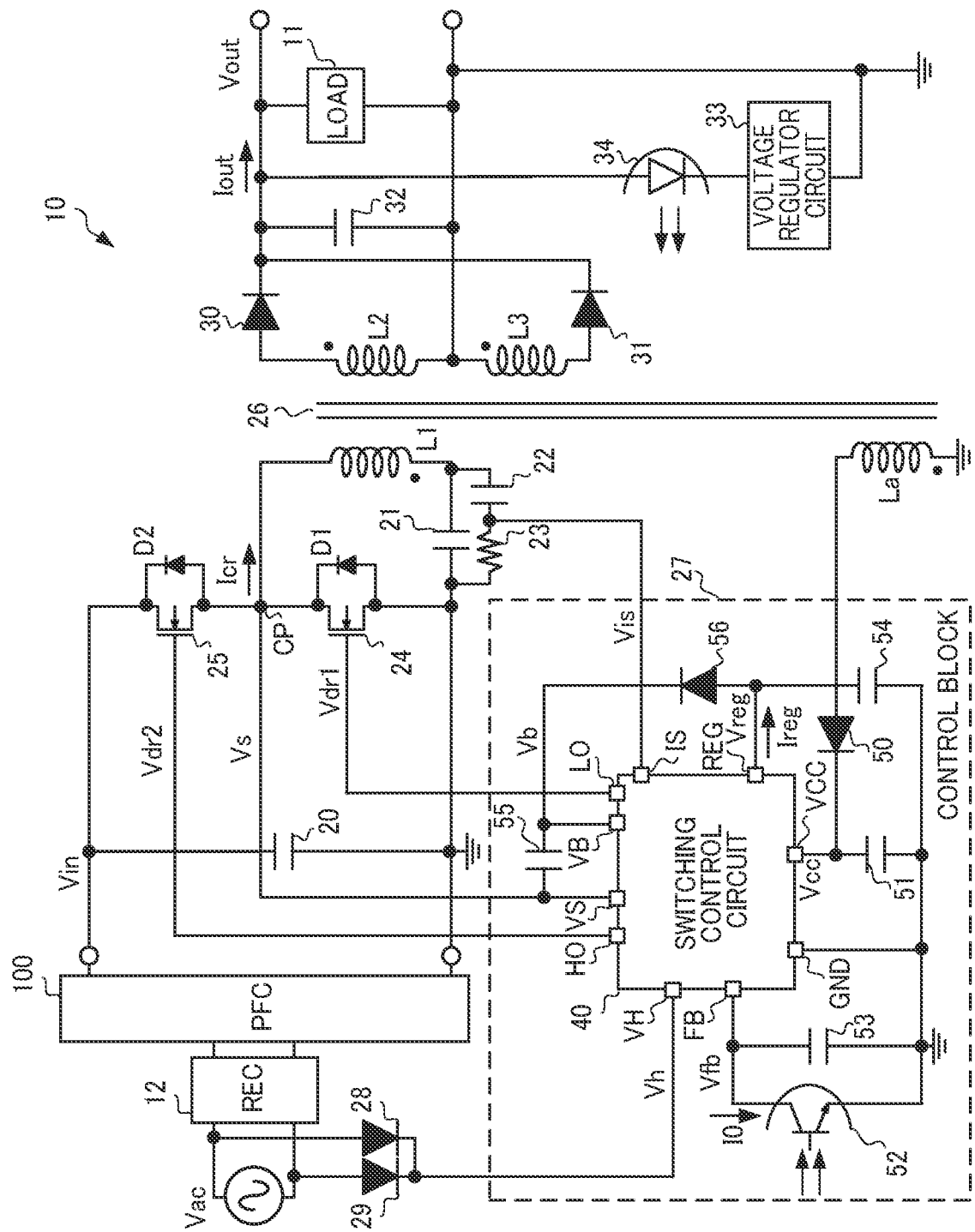
FIG. 1 is a diagram illustrating an example of a switching power supply circuit 10.

FIG. 1 is a diagram illustrating a configuration example of a switching power supply circuit 10 according to an emb0dimet of the present disclosure. The switching power supply circuit 10 is an LLC current resonant power supply circuit that generates an output voltage Vout of a target level at a load 11 from a predetermined input voltage Vin.

The switching power supply circuit 10 includes capacitors 20, 21, 22, 32, a resistor 23, NMOS transistors 24, 25, a transformer 26, a control block 27, diodes 28 to 31, a voltage regulator circuit 33, and a light-emitting diode 34. The switching power supply circuit 10 operates based on the input voltage Vin from a full-wave rectifier circuit (REC) 12 and a power factor correction circuit 100, the full-wave rectifier circuit 12 full-wave being configured to rectify an alternating current (AC) voltage Vac.

The power factor correction circuit 100 improves a power factor, as well as generates a direct-current (DC) voltage (i.e., the input voltage Vin (e.g., 400V)) from the output of the full-wave rectifier circuit 12.

The capacitor 20 stabilizes the voltage between a power supply line to receive the input voltage Vin and a ground line on the ground side, to thereby remove noise and the like. The capacitor 21 is a so-called resonant capacitor configuring a resonant circuit with a leakage inductance and an excitation inductance determined based on coils L1 to L3 of the transformer 26.

The capacitor 22 and the resistor 23 configure a circuit that shunts and detects a resonant current Icr flowing through the capacitor 21. The capacitor 22 and the resistor 23, which are coupled in series, are coupled in parallel with the capacitor 21.

The resistor 23 generates a voltage Vis, based on a current obtained by shunting the resonant current Icr. Accordingly, the voltage Vis results in a voltage corresponding to the resonant current Icr. Note that the resonant current Icr when flowing in the direction given in FIG. 1 is referred to as positive resonant current Icr, and the voltage Vis in this case is a positive voltage.

Assuming here that a node at which the NMOS transistors 24 and 25 are coupled is a node CP, the direction in which the resonant current Icr flows from the node CP through the primary coil L1 to the capacitor 21 is a positive direction. Meanwhile, the direction in which the resonant current Icr flows from the capacitor 21 through the primary coil L1 to the node CP is a negative direction. Note that, the resonant current Icr in the positive direction is given by an arrow as the resonant current Icr in FIG. 1.

The NMOS transistor 24 is a low-side power transistor, and the NMOS transistor 25 is a high-side power transistor. Specifically, the NMOS transistors 24, 25 are coupled in series between a node to receive the input voltage Vin and a node to receive a ground voltage. Note that, in an embodiment of the present disclosure, the NMOS transistors 24, 25 are used as a switching device. However, for example, P-channel metal-oxide-semiconductor (PMOS) transistors or bipolar transistors may be used. Note that the NMOS transistor 24 corresponds to a "first switching device", and the NMOS transistor 25 corresponds to a "second switching device".

The transformer 26 includes the primary coil L1, the secondary coils L2, L3, and the auxiliary coil La. The primary coil L1, the secondary coils L2, L3, and the auxiliary coil La are insulated from one another. In the transformer 26, voltages are generated in the secondary coils L2, L3 on the secondary side and the auxiliary coil La, according to variation in the voltage across the primary coil L1 on the primary side.

Further, the primary coil L1 has one end to which the drain of the NMOS transistor 24 and the source of the NMOS transistor 25 are coupled, and the other end to which the source of the NMOS transistor 24 is coupled through the capacitor 21.

Accordingly, upon start of switching of the NMOS transistors 24, 25, each of the voltages at the secondary coils L2, L3 and the auxiliary coil La varies. Note that the primary coil L1 and the secondary coils L2, L3 are electromagnetically coupled with different polarities, and the primary coil L1 and the auxiliary coil La are electromagnetically coupled with the same polarity. Note that the primary coil L1 corresponds to a "first coil", and the auxiliary coil La corresponds to a "second coil".

The control block 27 is a circuit block that controls switching of the NMOS transistors 24, 25, which will be described later in detail.

The diodes 28, 29 full-wave rectify the AC voltage Vac, and applies a resultant voltage as a voltage Vh to a switching control circuit 40.

The diodes 30, 31 rectify the voltages at the secondary coils L2, L3, and the capacitor 32 smooths the rectified voltages. As a result, the output voltage Vout having been smoothed is generated at the capacitor 32. Note that the output voltage Vout results in a DC voltage of a target level.

The voltage regulator circuit 33 generates a constant DC voltage, and is configured using, for example, a shunt regulator.

The light-emitting diode 34 is an element to emit light with an intensity corresponding to a difference between the output voltage Vout and the output of the voltage regulator circuit 33, and configures a photocoupler with a phototransistor 52 which will be described later. In an embodiment of the present disclosure, the intensity of the light from the light-emitting diode 34 increases with a rise in the level of the output voltage Vout.

Control Block 27

The control block 27 includes the switching control circuit 40, diodes 50, 56, capacitors 51, 53 to 55, and the phototransistor 52.

The switching control circuit 40 controls switching of the NMOS transistors 24, 25, and has the terminals VCC, REG, GND, FB, IS, HO, LO, VS, VB, VH.

The terminal VCC is a terminal to which a power supply voltage Vcc corresponding to the voltage from the auxiliary coil La of the transformer 26 is applied, and to which the cathode of the diode 50 and the capacitor 51 having one end grounded are coupled. Then, in response to the capacitor 51 being charged with the current from the auxiliary coil La of the transformer 26, the charge voltage of the capacitor 51 results in the power supply the voltage Vcc. Note that the capacitor 51 corresponds to a "first capacitor", and the power supply voltage Vcc corresponds to a "first power supply voltage".

The terminal GND is a terminal to which the ground voltage is applied, and to which, for example, the housing of a device where the switching power supply circuit 10 is provided or the like is coupled.

The terminal FB is a terminal at which a feedback voltage Vfb corresponding to the output voltage Vout is generated, and to which the phototransistor 52 and the capacitor 53 are coupled. The phototransistor 52 passes, from the terminal FB to the ground, a bias drive current I0 having a magnitude corresponding to the intensity of the light from the light-emitting diode 34, and the capacitor 53 is provided to remove noise between the terminal FB and the ground. Thus, the phototransistor 52 operates as a transistor to generate a sink current.

The terminal IS is a terminal to detect the current value of the resonant current of the primary coil L1. Here, the voltage corresponding to the current value of the resonant current of the primary coil L1 is generated at the node at which the capacitor 22 and the resistor 23 are coupled. Thus, the voltage Vis corresponding to the current value of the resonant current of the primary coil L1 is applied to the terminal IS.

The terminal LO is a terminal from which a driving signal Vdr1 for driving the NMOS transistor 24 is outputted, and to which the gate of the NMOS transistor 24 is coupled.

The terminal HO is a terminal from which a driving signal Vdr2 for driving the NMOS transistor 25 is outputted, and to which the gate of the NMOS transistor 25 is coupled.

The terminal VS is a terminal to receive the voltage at the coupling node at which the drain terminal of the NMOS transistor 24 and the source terminal of the NMOS transistor 25 are coupled. Upon turning on of the NMOS transistor 24, the ground voltage is applied to the terminal VS, and upon turning on of the NMOS transistor 25, the input voltage Vin is applied thereto.

The terminal REG is a terminal from which a power supply circuit 320 (described later) in the switching control circuit 40 outputs a power supply voltage Vreg, and to which the capacitor 54 for stabilizing the power supply voltage Vreg is coupled. Further, a current Ireg is outputted from the terminal REG.

The terminal VB receives a voltage Vb used as a power supply voltage for a buffer 607 (described later) that outputs the driving signal Vdr2. Further, one end of the capacitor 55 for stabilizing the voltage Vb and the cathode of the diode 56 are coupled to the terminal VB. The other end of the capacitor 55 is coupled to the terminal VS, and the anode of the diode 56 is coupled to the terminal REG.

The potential of a voltage Vs at the terminal VS is the reference potential of the voltage Vb for turning on the NMOS transistor 25 when the input voltage Vin is being applied to the terminal VS. Further, when the NMOS transistor 24 is turned on and the voltage Vs results in the ground voltage, the diode 56 charges the capacitor 55, based on the voltage Vreg. Meanwhile, when the NMOS transistor 25 is turned on and the voltage Vs results in the input voltage Vin, the voltage Vb results in the power supply voltage for the buffer 607, based on the voltage with which the capacitor 55 is charged.

The terminal VH is a terminal to which the voltage Vh corresponding to the AC voltage Vac is applied. The switching control circuit 40 receives the voltage Vh at a startup circuit 300 (described later), and charges the capacitor 51. Accordingly, the power supply voltage Vcc is generated at the capacitor 51 when the switching control circuit 40 starts up.

Chip Configuration of Switching Control Circuit 40

Figure 2:
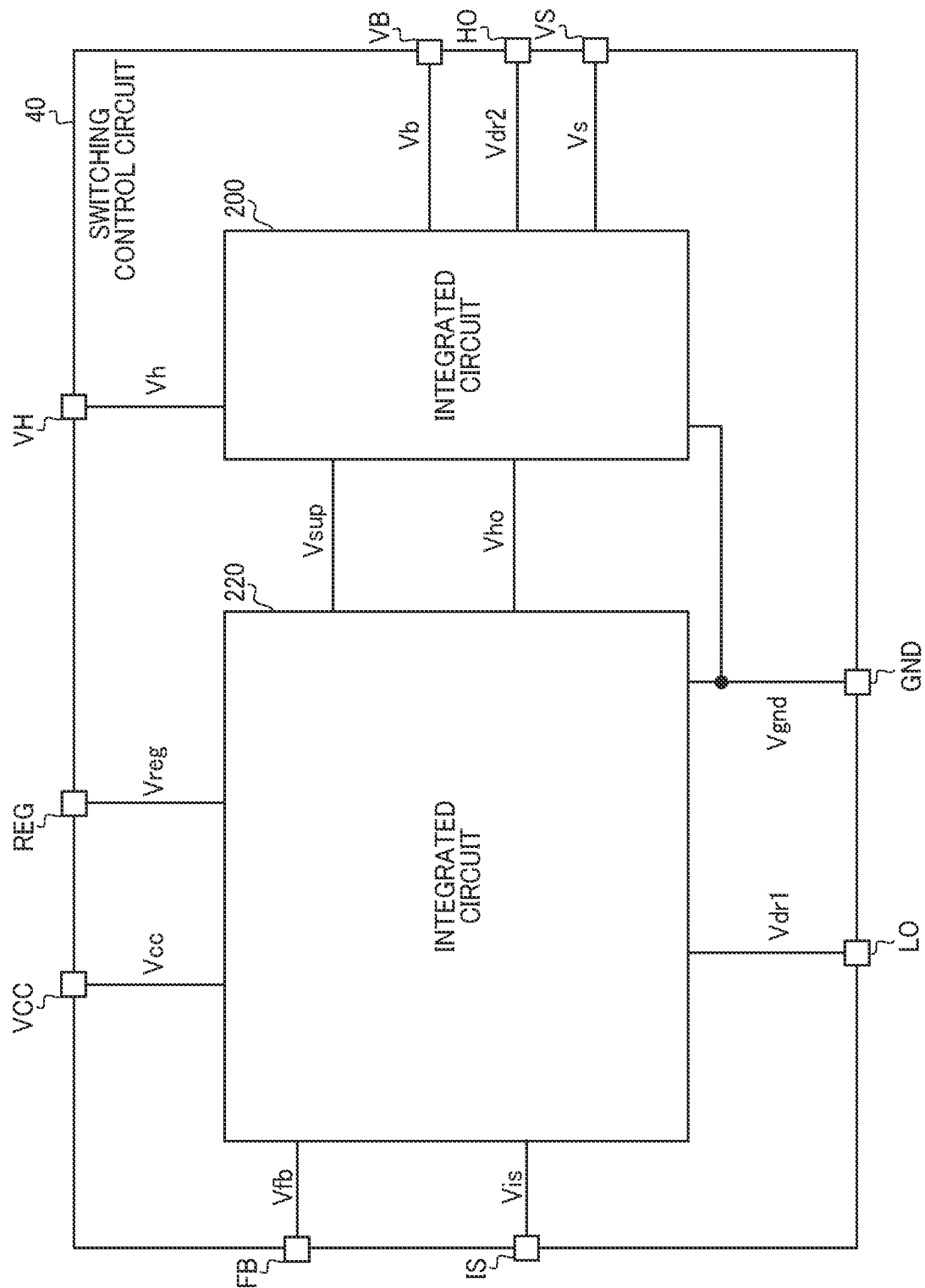
FIG. 2 is a diagram illustrating an example of a chip configuration of a switching control circuit 40.

FIG. 2 is a diagram illustrating a chip configuration of the switching control circuit 40. The switching control circuit 40 includes integrated circuits 200, 220. The integrated circuit 200 includes high withstand voltage semiconductor devices, and receives the voltages Vh, Vb, Vs and the ground voltage from the terminals VH, VB, VS, and GND, respectively. Here, the buffer 607 (described later) and a startup element 400 (described later) are included in the integrated circuit 200.

The integrated circuit 220 includes low withstand voltage semiconductor devices, and receives the voltages Vreg, Vcc, Vfb, Vis, and the ground voltage from the terminals REG, VCC, FB, IS, and GND, respectively. Here, circuits other than the buffer 607 and the startup element 400, of circuits included in the switching control circuit 40 are included in the integrated circuit 220. Note that the integrated circuit 200 corresponds to a "first integrated circuit", and the integrated circuit 220 corresponds to a "second integrated circuit".

Details of Switching Control Circuit 40

Figure 3:
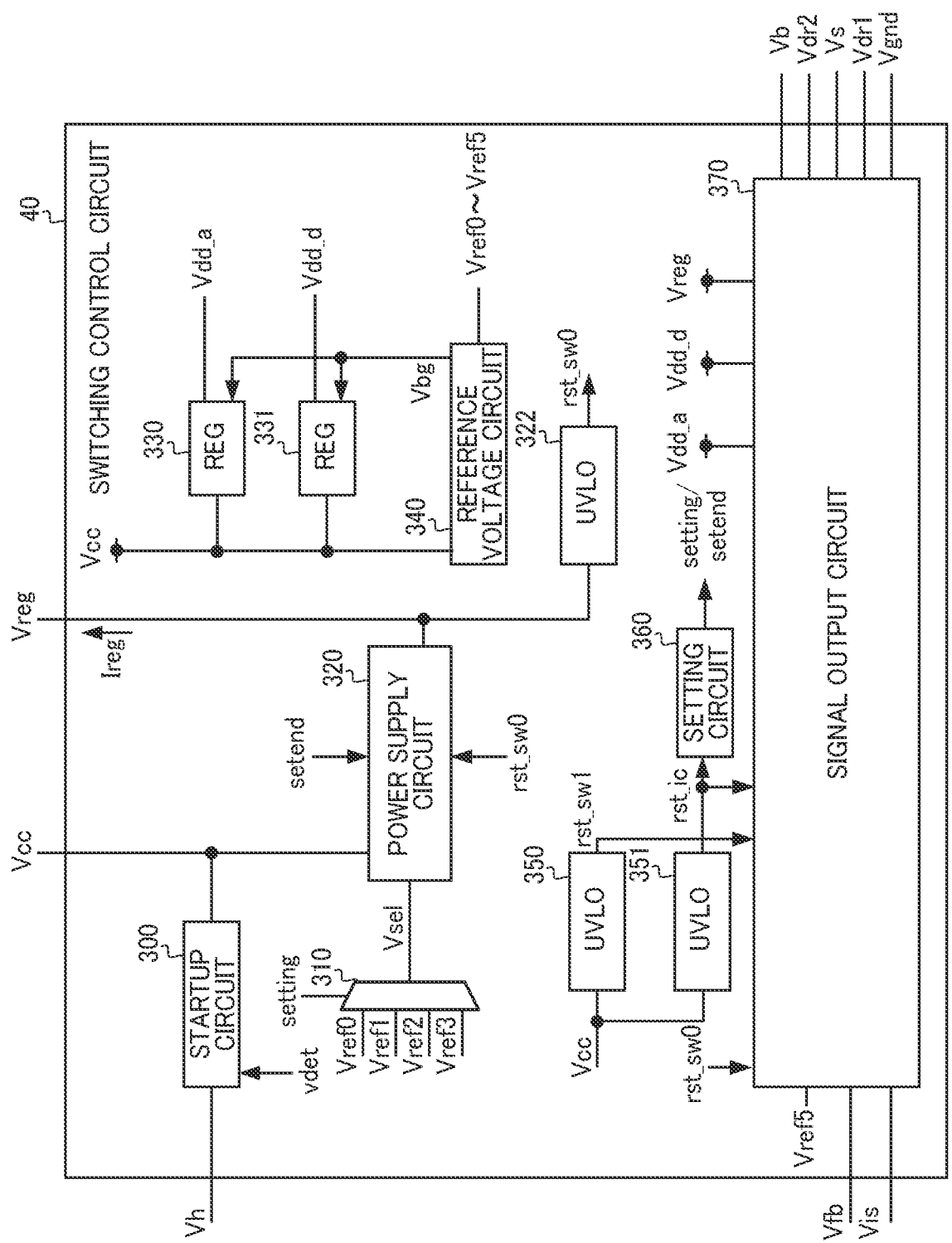
FIG. 3 is a diagram illustrating an example of a circuit configuration of a switching control circuit 40.

FIG. 3 is a diagram illustrating an example of a circuit configuration of the switching control circuit 40. Here, FIG. 3 illustrates the circuits included in each of the integrated circuits 200, 220 in the form of functional blocks. The switching control circuit 40 is a semiconductor module that switches the NMOS transistors 24, 25, based on the magnitude of the resonant current Icr. The switching control circuit 40 includes the startup circuit 300, a selector circuit 310, the power supply circuit 320, an under-voltage lockout circuits (UVLOs) 322, 350, 351, regulators 330, 331, a reference voltage circuit 340, a setting circuit 360, and a signal output circuit 370. Note that the switching control circuit 40, for example, may be constituted by a single integrated circuit, without including a semiconductor module constituted by the integrated circuits 200, 220.

Startup Circuit 300

Figure 4:
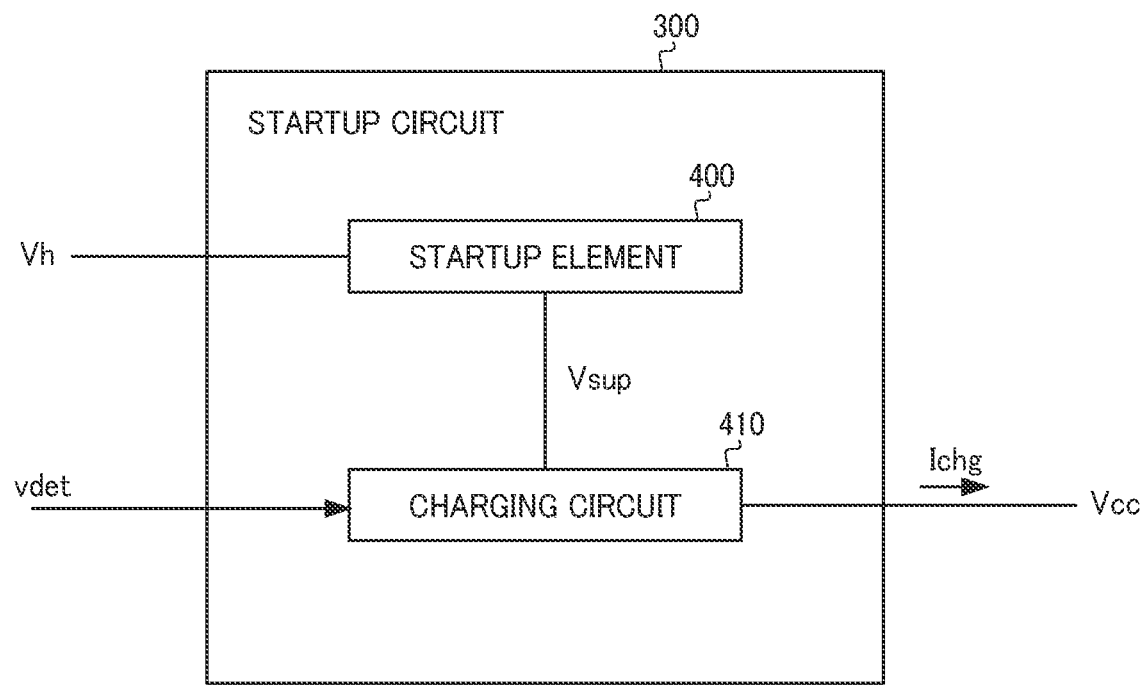
FIG. 4 is a diagram illustrating an example of a startup circuit 300.

The startup circuit 300 charges the capacitor 51 and generates a voltage Vcc, based on the voltage Vh, when the switching control circuit 40 starts up. The startup circuit 300 includes the startup element 400 and a charge circuit 410, as illustrated in FIG. 4.

Startup Element 400

The startup element 400 generates a charging voltage Vsup, based on the voltage Vh corresponding to the AC voltage Vac. Specifically, the startup element 400 (e.g., JFET) generates the voltage Vsup of a predetermined level (e.g., 30 V) from the voltage Vh corresponding to the AC voltage Vac.

Charge Circuit 410

The charge circuit 410 charges the capacitor 51 with a current Ichg corresponding to the charging voltage Vsup, based on the power supply voltage Vcc. Specifically, the charge circuit 410 charges the capacitor 51 when the voltage Vcc is lower than a predetermined level (e.g., the level of a reference voltage Vref4).

Meanwhile, the charge circuit 410 stops charging the capacitor 51, in response to the voltage Vcc reaching the predetermined level (e.g., the level of the reference voltage Vref4).

Selector Circuit 310

The selector circuit 310 in FIG. 3 selects a reference voltage for causing the power supply voltage Vreg outputted by the power supply circuit 320 (described later) to reach a target level, among a plurality of reference voltages (e.g., reference voltages Vref0 to Vref3). Specifically, the selector circuit 310 sets, as a voltage Vsel, the reference voltage, selected among the reference voltages Vref0 to Vref3, for determining the target level of the voltage Vreg, based on a signal setting outputted (which will be described later in detail) by the setting circuit 360 (described later).

Power Supply Circuit 320

Figure 5:
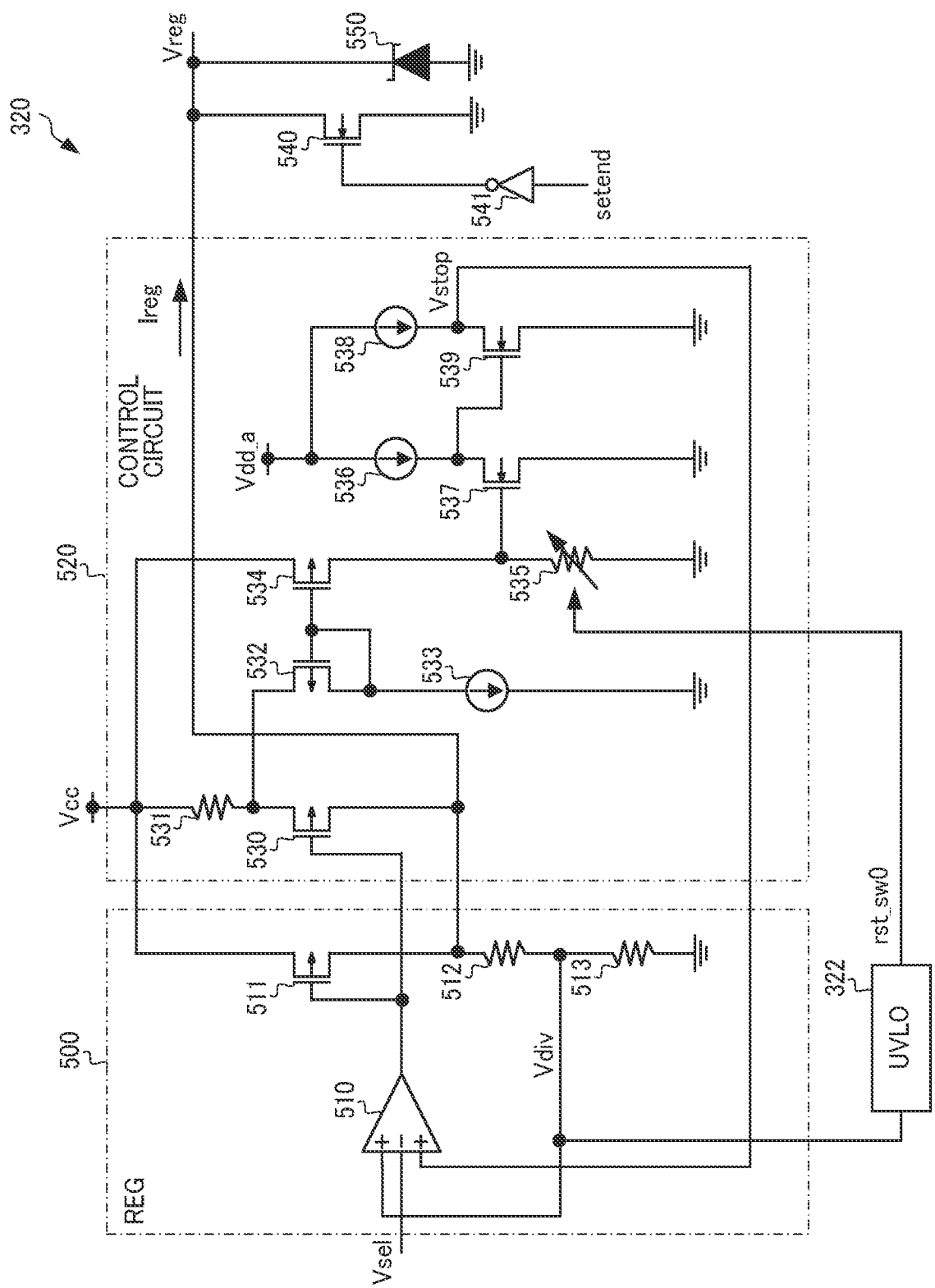
FIG. 5 is a diagram illustrating an example of a power supply circuit 320.

The power supply circuit 320 generates the power supply voltage Vreg from the voltage Vcc. Specifically, the power supply circuit 320 drops the voltage Vcc, to thereby output the power supply voltage Vreg, based on the voltage Vsel from the selector circuit 310. Further, a signal setend from the setting circuit 360 will be described later. The power supply circuit 320 includes a regulator (REG) 500, a control circuit 520, an NMOS transistor 540, an inverter 541, and a Zener diode 550, as illustrated in FIG. 5.

Regulator 500

The regulator 500 drops the power supply voltage Vcc, to thereby generate the power supply voltage Vreg. Specifically, the regulator 500 generates, from the power supply voltage Vcc, the power supply voltage Vreg of a target level, based on the reference voltage selected by the selector circuit 310 and the voltage corresponding to the power supply voltage Vreg. Note that the drive current Ireg outputted from the terminal REG is the current outputted by a PMOS transistor 511 of the regulator 500 and a PMOS transistor 530 (described later).

The regulator 500 includes an operational amplifier 510, the PMOS transistor 511, and resistors 512, 513. Note that the regulator 500 corresponds to a "regulator", and the power supply voltage Vreg corresponds to a "second power supply voltage".

Operational Amplifier 510

The operational amplifier 510 outputs the gate voltage of the PMOS transistor 511 such that a voltage Vdiv at the coupling point of the resistors 512, 513 will be the voltage Vsel to be applied to the inverting input thereof. Further, the operational amplifier 510 outputs the gate voltage of the PMOS transistor 511 based on a higher voltage out of the voltage Vdiv (e.g., the voltage Vsel) and a voltage Vstop (e.g., a voltage Vdd_a or the ground voltage), which are applied to two non-inverting inputs thereof, respectively.

PMOS Transistor 511, Resistors 512, 513

The PMOS transistor 511 outputs the voltage Vreg obtained by dropping the voltage Vcc, based on the gate voltage from the operational amplifier 510. Further, the resistors 512, 513 are coupled in series, and one end thereof receives the voltage Vreg, and the other end thereof is grounded. Then, the resistors 512, 513 output the voltage Vdiv at the coupling point of the resistors 512, 513.

Control Circuit 520

The control circuit 520 controls the regulator 500 such that the drive current Ireg decreases, in response to the drive current Ireg reaching a predetermined value I1_limit0. Specifically, the control circuit 520 controls the regulator 500 such that the PMOS transistors 511, 530 are turned off, in response to the drive current Ireg reaching the predetermined value I1_limit0. Further, in this case, the control circuit 520 outputs the voltage Vstop higher than the voltage Vsel, and causes the operational amplifier 510 to turn off the PMOS transistor 511, to thereby cause the regulator 500 to stop supply of the drive current Ireg. Note that the predetermined value I1_limit0 corresponds to a "first predetermined value".

The control circuit 520 includes the PMOS transistor 530, PMOS transistors 532, 534, a resistor 531, current sources 533, 536, 538, a variable resistor 535, and NMOS transistors 537, 539.

PMOS Transistor 530, Resistor 531

The PMOS transistor 530 is a device that passes a current corresponding to the current flowing through the PMOS transistor 511. Specifically, the PMOS transistor 530 has a gate to receive the gate voltage of the PMOS transistor 511. Accordingly, the current corresponding to the current flowing through the PMOS transistor 511 flows through the PMOS transistor 530.

The PMOS transistor 530 has a source to receive the voltage Vcc through the resistor 531, and a drain to receive the voltage Vreg. Thus, as the drive current Ireg increase, the source voltage of the PMOS transistor 530 drops from the voltage Vcc.

PMOS Transistor 532, Current Source 533

The PMOS transistor 532 has a source to receive the source voltage of the PMOS transistor 530. Then, the drain and gate of the PMOS transistor 532 are coupled to each other. In other words, the PMOS transistor 532 is diode-connected. Further, the current source 533 for passing a constant current is provided between the drain of the PMOS transistor 532 and the ground.

In response to a drop in the source voltage of the PMOS transistor 530, the gate voltage of the PMOS transistor 532 drops, and the on-resistance thereof drops as well, so that the current source 533 can pass a constant current.

PMOS Transistor 534, Variable Resistor 535

The PMOS transistor 534 passes a larger amount of currents as the value of the drive current Ireg increases, to thereby raise the voltage generated at the variable resistor 535. Specifically, the PMOS transistor 534 has a gate to receive the gate voltage of the PMOS transistor 532, and a source to receive the voltage Vcc. Then, the variable resistor 535 is provided between the drain of the PMOS transistor 532 and the ground.

In response to a drop in the gate voltage of the PMOS transistor 532, the gate-source voltage of the PMOS transistor 534 rises, and the on-resistance of the PMOS transistor 534 decreases. Thus, the current flowing through the PMOS transistor 534 increases based on the voltage Vcc, and the voltage generated at the variable resistor 535 increases as well.

Current Sources 536, 538, NMOS Transistors 537, 539

The current source 536 and the NMOS transistor 537 function as an inverter that outputs the ground voltage or the voltage Vdd_a at the coupling point, according to the gate voltage of the NMOS transistor 537. Further, the same applies to the current source 538 and the NMOS transistor 539.

Further, the NMOS transistor 537 has a gate to receive the voltage generated at the variable resistor 535, a source grounded, and a drain to receive the voltage Vdd_a through the current source 536. Further, the NMOS transistor 539 has a gate to receive the drain voltage of the NMOS transistor 537, a source grounded, and a drain to receive the voltage Vdd_a through the current source 538.

From the above, in response to the voltage generated at the variable resistor 535 exceeding the threshold voltage of the NMOS transistor 537, the NMOS transistor 537 is turned on, and the drain voltage of the NMOS transistor 537 results in the ground voltage. Accordingly, the NMOS transistor 539 is turned off, and the voltage Vstop, which is the drain voltage of the NMOS transistor 539, results in the voltage Vdd_a. Note that the voltage Vdd_a is higher than the voltage Vsel. Accordingly, the control circuit 520 stops the regulator 500 from generating the power supply voltage Vreg, in response to the drive current Ireg reaching a predetermined value (e.g., I1_limit0).

NMOS Transistor 540

When the output of the power supply voltage Vreg through the terminal REG should be stopped, the NMOS transistor 540 is turned on, to thereby discharge the capacitor 54 in FIG. 1. Specifically, the NMOS transistor 540 remains on, until the power supply voltage Vcc rises and the setting circuit 360 outputs the signal setend indicating completion of setting of an internal circuit (e.g., the selector circuit 310) of the switching control circuit 40.

Further, when the under-voltage lockout circuit 351 (described later) outputs a signal rst_ic to reset the switching control circuit 40, the setting circuit 360 outputs the signal setend indicating that the setting of the internal circuit is incomplete, and thus the NMOS transistor 540 is turned on. Further, the NMOS transistor 540 has a drain coupled to the terminal REG, a gate to receive the signal obtained by inverting the logic level of the signal setend by the inverter 541, and a source grounded.

Zener Diode 550

The Zener diode 550 is an element to perform protection such that, even if the power supply voltage Vcc extremely rises, the power supply voltage Vreg produced by dropping the power supply voltage Vcc does not become excessively high.

Under-Voltage Lockout Circuit (UVLO) 322

The under-voltage lockout circuit 322 in FIG. 3 stops the operation of the signal output circuit 370, upon a drop in the power supply voltage Vreg. Specifically, the under-voltage lockout circuit 322 stops the operation of a drive signal generator circuit 605 (described later), in response to the power supply voltage Vreg reaching a predetermined level Vref_reg_off lower than the target level. Here, the phrase "stop the operation of the drive signal generator circuit 605" indicates that the drive signal generator circuit 605 outputs driving signals Vlo, Vho of a low level (hereinafter, referred to as low or low level), to thereby stop switching the NMOS transistors 24, 25.

In this case, the under-voltage lockout circuit 322 outputs a signal rst_sw0 to stop the operation of the drive signal generator circuit 605. Meanwhile, the under-voltage lockout circuit 322 outputs the signal rst_sw0 to operate the drive signal generator circuit 605, when the power supply voltage Vreg is higher than the predetermined level Vref_reg_off.

Accordingly, the under-voltage lockout circuit 322 reduces malfunctions of buffers 606, 607 (described later), when the power supply voltage Vcc is high but the power supply voltage Vreg drops. Note that the under-voltage lockout circuit 322 corresponds to a "first protection circuit".

Further, the under-voltage lockout circuit 322, as illustrated in FIG. 5, changes the resistance value of the variable resistor 535, based on whether the power supply voltage Vreg is higher than the predetermined level Vref_reg_off. Specifically, the under-voltage lockout circuit 322 causes the variable resistor 535 to have a resistance value R0 such that the value of the drive current Ireg from the PMOS transistor 511 decreases, when the power supply voltage Vreg is lower than the predetermined level Vref_reg_off.

Meanwhile, the under-voltage lockout circuit 322 causes the variable resistor 535 to have a resistance value R1 such that the value of the drive current Ireg from the PMOS transistor 511 increases, when the power supply voltage Vreg is higher than the predetermined level Vref_reg_off. Note that the resistance value R0 is larger than the resistance value R1.

In an embodiment of the present disclosure, when the variable resistor 535 has the resistance value R0, the NMOS transistor 537 is turned on, in response to the drive current Ireg reaching the predetermined value I1_limit0. As a result, the control circuit 520 controls the regulator 500 such that the drive current Ireg decreases.

Further, when the variable resistor 535 has the resistance value R1, the NMOS transistor 537 is turned on, in response to the drive current Ireg reaching a predetermined value I1_limit1. As a result, the control circuit 520 controls the regulator 500 such that the drive current Ireg decreases. Note that the predetermined value I1_limit0 is smaller than the predetermined value I1_limit1.

Accordingly, in an embodiment of the present disclosure, when the power supply voltage Vreg is lower than the target level, the control circuit 520 controls the regulator 500 such that the drive current Ireg is limited to a smaller value. Note that the predetermined value I1_limit0 corresponds to a "second predetermined value", the predetermined value I1_limit1 corresponds to a "first predetermined value", and the predetermined level Vref_reg_off corresponds to a "first level". In addition, in an embodiment of the present disclosure, the predetermined value I1_limit0 is, for example, 6 mA, and the predetermined value I1_limit1 is, for example, 30 mA.

Regulator (REG) 330

The regulator 330 in FIG. 3 generates the power supply voltage Vdd_a for an internal analog circuit of the switching control circuit 40 from the power supply voltage Vcc, based on a band gap voltage Vbg from the reference voltage circuit 340 (described later).

Regulator (REG) 331

The regulator 331 generates a power supply voltage Vdd_d for an internal digital circuit of the switching control circuit 40 from the power supply voltage Vcc, based on the band gap voltage Vbg from the reference voltage circuit 340.

Reference Voltage Circuit 340

The reference voltage circuit 340 includes a band gap circuit (not illustrated) that generates the band gap voltage Vbg serving as a reference of the voltage used in the internal circuit of the switching control circuit 40. Further, the reference voltage circuit 340 generates a reference voltage (e.g., the band gap voltage Vbg and the reference voltages Vref0 to Vref4 and a reference voltage Vref5) from the power supply voltage Vcc, based on the band gap voltage Vbg. Furthermore, the reference voltage circuit 340 also generates a reference voltage (e.g., Vref_reg_off) to detect the voltage levels of various voltages in addition to the band gap voltage Vbg and the reference voltage Vref0 to Vref5.

Under-Voltage Lockout Circuit (UVLO) 350

The under-voltage lockout circuit 350 stops the operation of the drive signal generator circuit 605 (described later), based on the voltage level of the power supply voltage Vcc. Specifically, in response to the power supply voltage Vcc dropping to a predetermined level Vref_vcc_off0 ower than the level of the reference voltage Vref4, the under-voltage lockout circuit 350 stops the operation of the drive signal generator circuit 605 while allowing the regulator 500 to operate, to thereby stop the operations of the buffers 606, 607. Here, the phrase "stop the operations of the buffers 606, 607" indicates that, with the operation of the drive signal generator circuit 605 being stopped, the buffers 606, 607 output the driving signals Vdr1, Vdr2 to turn off the NMOS transistors 24, 25.

Further, the under-voltage lockout circuit 350 outputs a signal rst_sw1 to stop the operation of the drive signal generator circuit 605, in response to the power supply voltage Vcc reaching the predetermined level Vref_vcc_off0. Meanwhile, the under-voltage lockout circuit 350 outputs the signal rst_sw1 to operate the drive signal generator circuit 605, in response to the power supply voltage Vcc being higher than the predetermined level Vref_vcc_off0.

Accordingly, the under-voltage lockout circuit 350 makes it possible to decrease the current value the drive current Ireg outputted by the regulator 500, thereby being able to prevent the power supply voltage Vreg from dropping, even if the power supply voltage Vcc drops. This reduces malfunctions of the switching control circuit 40 caused by the power supply voltage Vreg dropping with a delay from a transient drop in the power supply voltage Vcc. Note that the under-voltage lockout circuit 350 corresponds to a "second protection circuit", and the predetermined level Vref_vcc_off0 corresponds to a "second level".

Under-Voltage Lockout Circuit 351

The under-voltage lockout circuit 351 stops the operation of the switching control circuit 40, based on the voltage level of the power supply voltage Vcc. Specifically, the under-voltage lockout circuit 351 stops the operation of the regulator 500, in response to the power supply voltage Vcc dropping to a predetermined level Vref_vcc_off1 lower than the predetermined level Vref_vcc_off0. Here, the phrase "stop the operation of the regulator 500" indicates that the power supply circuit 320 stops outputting the power supply voltage Vreg through the terminal REG.

Further, the under-voltage lockout circuit 351 outputs the signal rst_ic to stop the operation of the regulator 500, in response to the power supply voltage Vcc reaching the predetermined level Vref_vcc_off1. Meanwhile, the under-voltage lockout circuit 351 outputs the signal rst_ic to operate the regulator 500, in response to the power supply voltage Vcc being higher than the predetermined level Vref_vcc_off1.

Further, it is conceivable that the regulator 500 may not be able to sufficiently output the power supply voltage Vreg due to a drop in the power supply voltage Vcc, and thus the under-voltage lockout circuit 351 stops the output of the power supply voltage Vreg, and resets the switching control circuit 40. Accordingly, the under-voltage lockout circuit 351 can reduce malfunctions of the switching control circuit 40 caused by the unstable power supply voltage Vreg. Note that the under-voltage lockout circuit 351 corresponds to a "third protection circuit", and the predetermined level Vref_vcc_off1 corresponds to a "third level".

Setting Circuit 360

The setting circuit 360 in FIG. 3 performs setting of the internal circuit of the switching control circuit 40, upon startup of the switching control circuit 40. Specifically, in response to the voltage Vh being applied to the terminal VH, and the under-voltage lockout circuit 351 outputting the signal rst_ic to operate the regulator 500, the setting circuit 360 starts operating.

The setting circuit 360 reads data (e.g., setting) stored in memory (not illustrated), and outputs it to perform setting of the internal circuit (e.g., the selector circuit 310) of the switching control circuit 40. After completion of the setting of the internal circuit, the setting circuit 360 outputs the signal setend indicating completion of the setting. Meanwhile, the setting circuit 360 outputs the signal setend indicating that the setting of the internal circuit is incomplete during the setting of the internal circuit.

Signal Output Circuit 370

Figure 6:
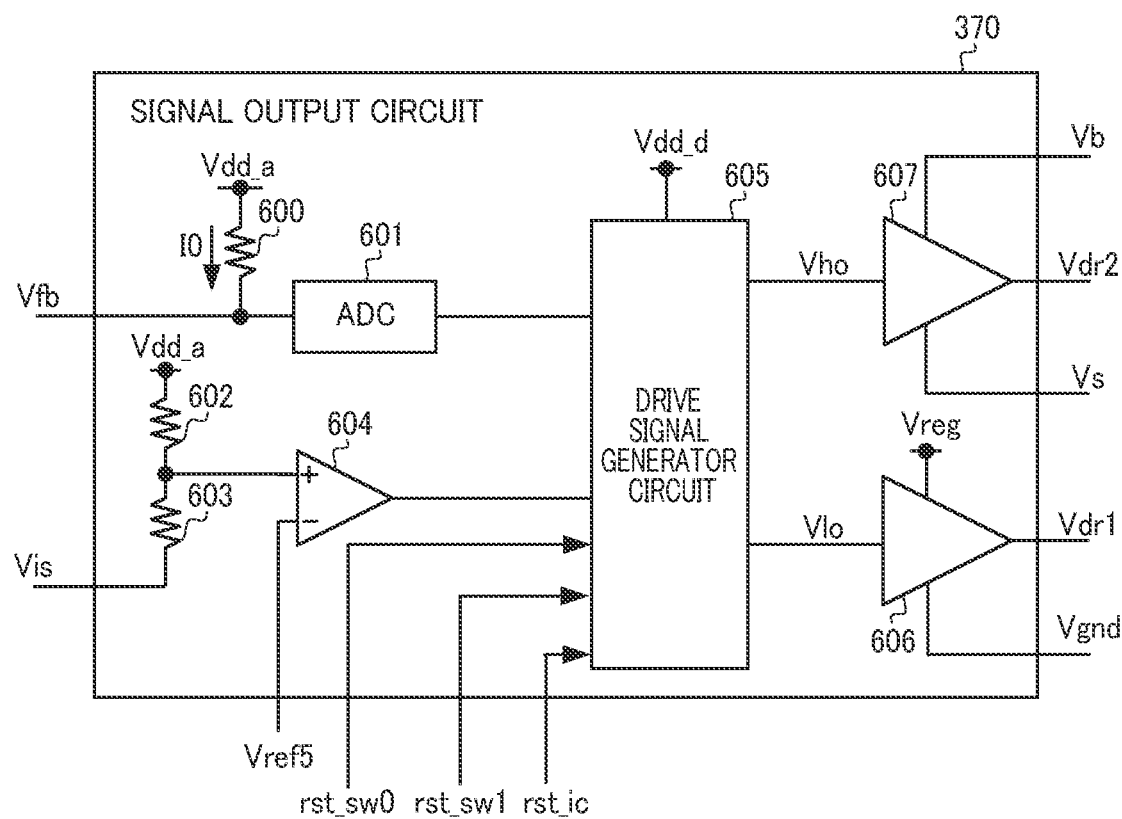
FIG. 6 is a diagram illustrating an example of a signal output circuit 370.

The signal output circuit 370 outputs the driving signals Vdr1, Vdr2 to drive the NMOS transistors 24, 25, based on the feedback voltage Vfb. The signal output circuit 370 includes, as illustrated in FIG. 6, the resistors 600, 602, 603, an analog-to-digital converter (ADC) 601, a comparator 604, the drive signal generator circuit 605, and the buffers 606, 607.

Resistor 600

The resistor 600 generates the feedback voltage Vfb, based on a bias current I0 from the phototransistor 52. Note that the resistor 600 has one end to receive the predetermined voltage Vdd_a, and the other end coupled to the terminal FB. Thus, the feedback voltage Vfb generated at the terminal FB is given by an expression (1):

$$Vfb = Vdd - Ra \times I0 \tag{1}$$

where "Ra" is the resistance value of the resistor 600.

As described above, in an embodiment of the present disclosure, the current value of the bias current I0 increases with a rise in the output voltage Vout. Thus, upon a rise in the output voltage Vout, the feedback voltage Vfb drops.

Analog-to-Digital Converter (ADC) 601

The analog-to-digital converter 601 coverts the feedback voltage Vfb into a digital value. Hereinafter, the feedback voltage Vfb having converted into the digital value is also referred to as feedback voltage Vfb.

Resistors 602, 603

The resistors 602, 603 make it possible to process the voltage Vis as a positive voltage in the switching control circuit 40. Specifically, the resistors 602, 603 configure a voltage divider resistor circuit that makes it possible to output a voltage corresponding to the voltage Vis as a positive voltage, even if the voltage Vis takes a positive or negative voltage, with the resonant current Icr flowing in a positive or negative direction.

The resistors 602, 603 are coupled in series, and the voltage Vdd_a is applied to one end thereof, and the voltage Vis is applied to the other end thereof.

Then, assuming, for example, that the voltage Vis varies in a range from −5 V to 5 V and the voltage Vdd_a is 5 V, the voltage outputted by the resistors 602, 603 results in a positive voltage around 2.5 V, with the same resistance value being set to the resistors 602, 603.

Comparator 604

The comparator 604 detects the direction of the resonant current Icr, based on the voltage outputted by the resistors 602, 603. Specifically, the comparator 604 compares the voltage outputted by the resistors 602, 603 and the reference voltage Vref5 (e.g., 2.5 V).

The comparator 604 detects that the resonant current Icr is flowing in the positive direction, when the voltage outputted by the resistors 602, 603 is higher than the reference voltage Vref5. Meanwhile, the comparator 604 detects that the resonant current Icr is flowing in the negative direction, when the voltage outputted by the resistors 602, 603 is lower than the reference voltage Vref5.

Drive Signal Generator Circuit 605

The drive signal generator circuit 605 generates the driving signals Vlo, Vho to drive the NMOS transistors 24, 25, based on the feedback voltage Vfb. Specifically, the drive signal generator circuit 605 generates the driving signals Vlo, Vho, based on the feedback voltage Vfb and the result of detection of the comparator 604.

The drive signal generator circuit 605 generates the driving signals Vlo, Vho having, for example, 50% high-level (hereinafter, high or high level) duty cycle, based on the feedback voltage Vfb. Note that the drive signal generator circuit 605 generates the driving signals Vlo, Vho with high frequencies, in response to the level of the feedback voltage Vfb dropping.

Further, the drive signal generator circuit 605 obtains a time period from when the driving signal Vlo or Vho goes low to when the polarity reversal of the resonant current Icr occurs, based on the result of detection of the comparator 604, and generates the driving signals Vlo, Vho, based on this time period. Accordingly, with the use of the fact that the magnitude of the load current included in the resonant current Icr varying with the condition of the load 11, the drive signal generator circuit 605 can generate the driving signals Vlo, Vho reflecting the condition of the load 11.

Further, upon receipt of any of the signals rst_sw0, rst_sw1, rst_ic to stop the operation of the drive signal generator circuit 605, the drive signal generator circuit 605 stops operating. Here, "the drive signal generator circuit 605 stops operating" indicates that the drive signal generator circuit 605 generates the low driving signals Vlo, Vho.

Buffers 606, 607

The buffers 606, 607 switch the NMOS transistors 24, 25, in response to the driving signals Vlo, Vho. Specifically, the buffer 606 operates with the power supply voltage Vreg, and outputs the driving signal Vdr1 to switch the NMOS transistor 24, in response to the driving signal Vlo. Further, the buffer 607 operates with the voltage Vb corresponding to the power supply voltage Vreg, and outputs the driving signal Vdr2 to switch the NMOS transistor 25 that applies the input voltage Vin to the primary coil L1, in response to the driving signal Vho. Note that the buffer 606 corresponds to a "first driver circuit", and the buffer 607 corresponds to a "second driver circuit".

Operation of Switching Control Circuit 40

Figure 7:
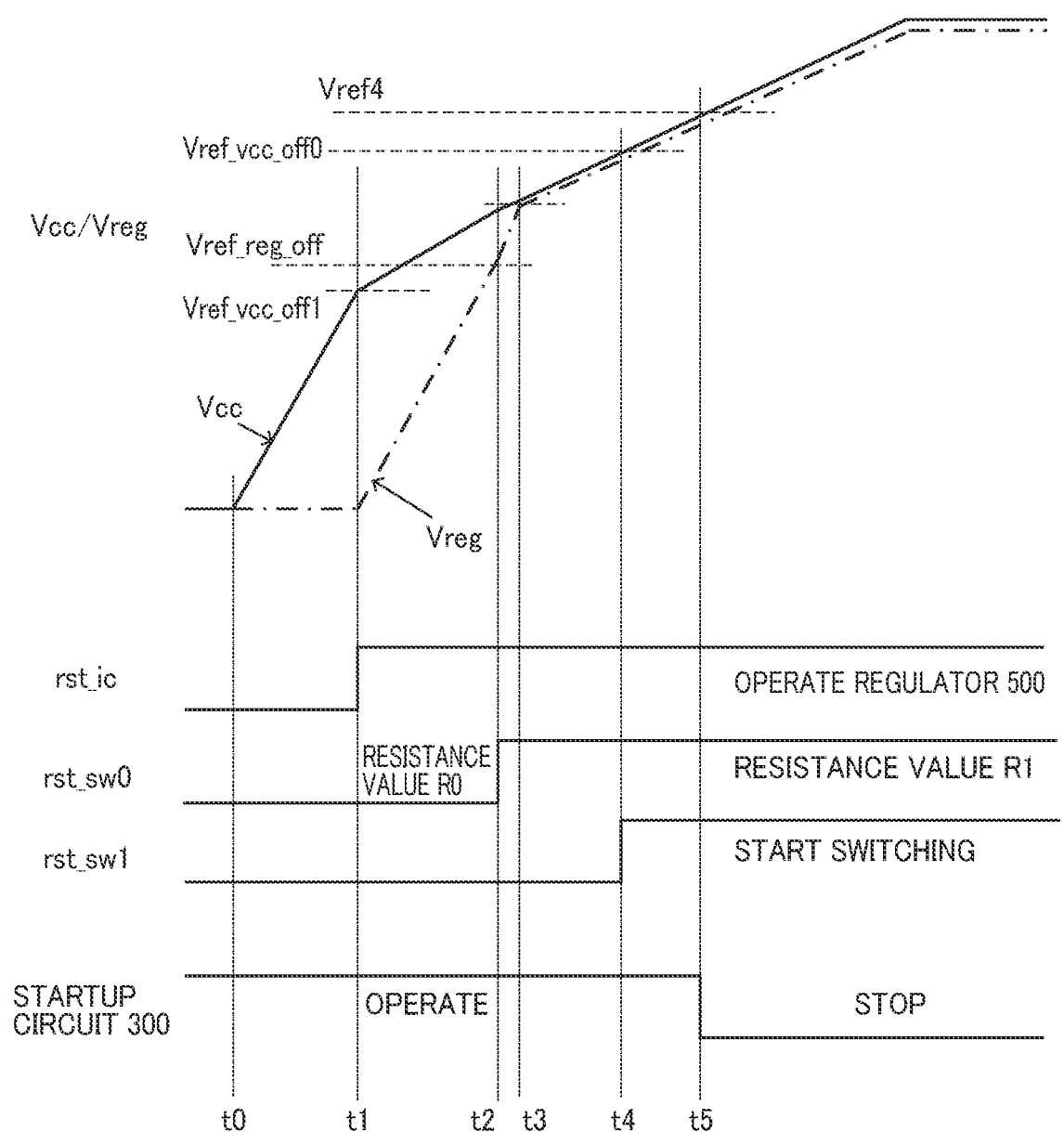
FIG. 7 is a chart illustrating an example of a n operation when a switching control circuit 40 starts up.

FIG. 7 is a diagram illustrating an example of the operation when the switching control circuit 40 starts up. FIGS. 8A to 8D are diagrams for explaining the current flowing through the switching control circuit 40 when the switching control circuit 40 starts up. FIG. 9 is a diagram illustrating an example of the waveform of the drive current Ireg when the switching control circuit 40 starts up.

Note that FIGS. 8A to 8D illustrate the startup circuit 300 and the PMOS transistor 511 of the regulator 500 that outputs the drive current Ireg, as blocks of part of the switching control circuit 40, for convenience. Further, it is assumed here that the current Ichg is 8 mA.

At time t0 in FIG. 7, in response to the AC voltage Vac being applied and the voltage Vh obtained by full-wave rectifying the AC voltage Vac being applied to the terminal VH, the startup circuit 300 outputs the current Ichg. In this event, the power supply voltage Vcc is lower than the predetermined level Vref_vcc_off1, and thus the under-voltage lockout circuit 351 causes the PMOS transistor 511 of the regulator 500 to be off.

Figure 8A:
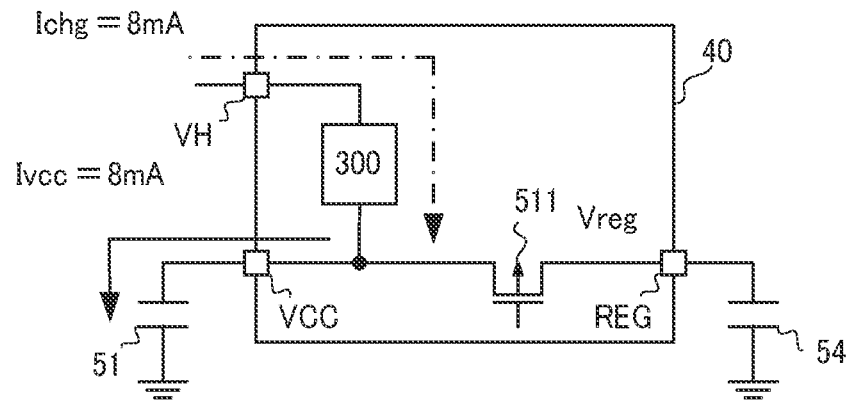
FIG. 8A is a diagram for explaining a current when a switching control circuit 40 starts up.
Figure 9:
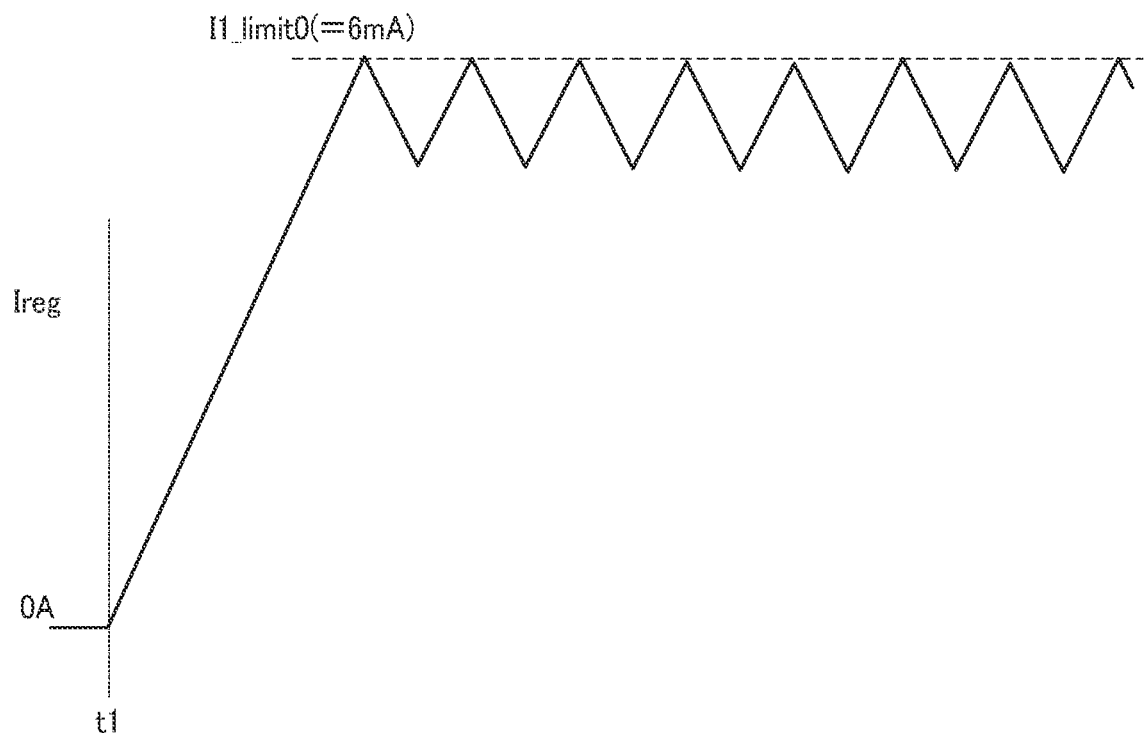
FIG. 9 is a diagram illustrating an example of a waveform of a drive current Ireg.

Accordingly, as illustrated in FIG. 8A, all the current Ichg outputted from the startup circuit 300 is used to charge the capacitor 51 as a current Ivcc. As a result, the power supply voltage Vcc given by a solid line in a current chart of FIG. 7 starts to rise.

Further, at time t1 in FIG. 7, in response to the power supply voltage Vcc exceeding the predetermined level Vref_vcc_off1, the under-voltage lockout circuit 351 changes the signal rst_ic to high, and causes the switching control circuit 40 to operate (i.e., causes the regulator 500 to operate).

Figure 8B:
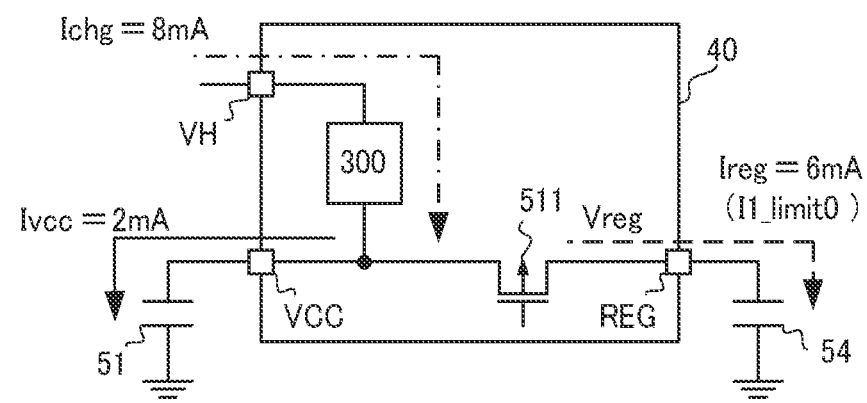
FIG. 8B is a diagram for explaining a current when a switching control circuit 40 starts up.

As a result, as illustrated in FIG. 8B, the PMOS transistor 511 of the regulator 500 is turned on, and thus the current Ichg is outputted to the capacitors 51 and 54, as the current Ivcc and the current Ireg, respectively. Thus, the power supply voltage Vreg of the regulator 500 given by a dashed-dotted line in FIG. 7 gradually rises.

Note that, in this timing, the power supply voltage Vreg is lower than the predetermined level Vref_reg_off, and thus the variable resistor 535 in FIG. 5 is of the resistance value R0 (>the resistance value R1). Accordingly, the control circuit 520 controls the regulator 500 such that the drive current Ireg is limited to the predetermined value I1_limit0 (here, 6 mA).

Accordingly, as illustrated in FIGS. 8B and 9, a current of substantially the predetermined value I1_limit0 (here, 6 mA) flows as the drive current Ireg. Note that, in response to the value of the drive current Ireg reaching the predetermined value I1_limit0 (here, 6 mA), the control circuit 520 in FIG. 5 controls the regulator 500 such that the drive current Ireg decreases.

Then, in response to the drive current Ireg becoming smaller than the predetermined value I1_limit0 (here, 6 mA), the regulator 500 outputs the drive current Ireg again. As a result, as illustrated in FIG. 9, the drive current Ireg results in a value slightly smaller than the predetermined value I1_limit0 (here, 6 mA). Note that, in FIG. 8B the value of the drive current Ireg in this timing is given as 6 mA, for convenience.

In response to the power supply voltage Vreg rising to the predetermined level Vref_reg_off at time t2, the variable resistor 535 in FIG. 5 results in the resistance value R1 (<the resistance value R0). Accordingly, the control circuit 520 controls the regulator 500 such that the drive current Ireg is limited to the predetermined value I1_limit1 (here, 30 mA).

Figure 8C:
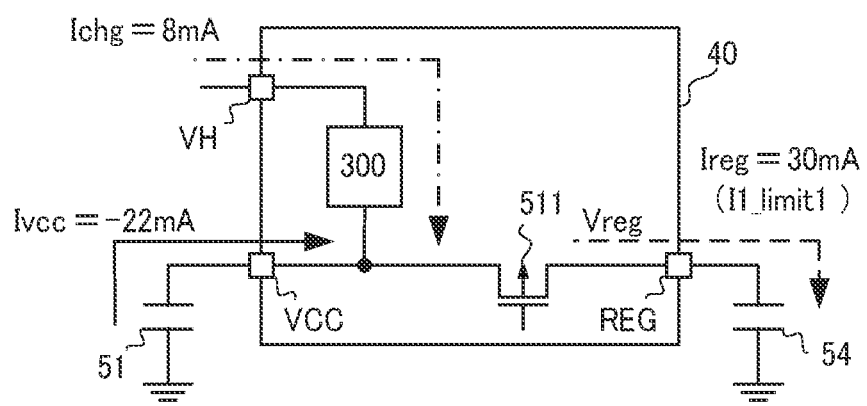
FIG. 8C is a diagram for explaining a current when a switching control circuit 40 starts up.

As a result, as illustrated in FIG. 8C, the sum of the current Ichg (8 mA) and the current Ivcc (22 mA) flowing from the capacitor 51 through the terminal VCC to the PMOS transistor 511 results in the drive current Ireg (30 mA). Note that, in this timing as well, the drive current Ireg results in a waveform similar to the waveform in FIG. 9 although the upper limit value is different therebetween.

In response to the level of the power supply voltage Vreg becoming close to the level of the power supply voltage Vcc, the current Ivcc flowing from the capacitor 51 through the terminal VCC to the PMOS transistor 511 decreases.

Figure 8D:
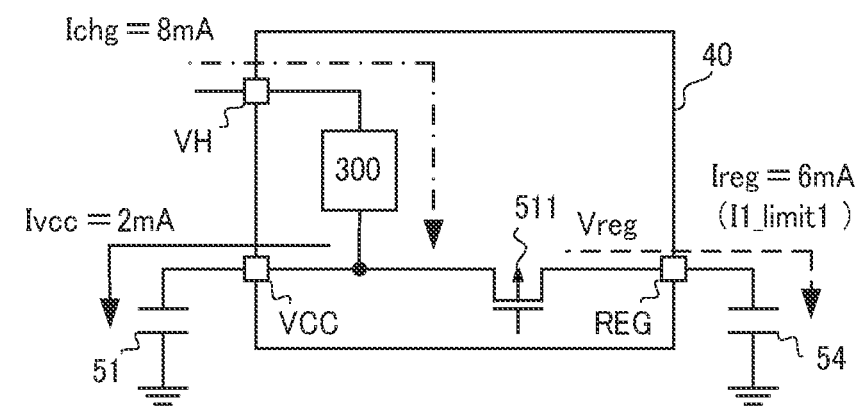
FIG. 8D is a diagram for explaining a current when a switching control circuit 40 starts up.

Then, at time t3, the level of the power supply voltage Vreg rises to substantially the level of the power supply voltage Vcc, as illustrated in FIG. 8D, the current Ichg results in a value according to the capacitance values of the capacitors 51, 54. Note that, in an embodiment of the present disclosure, the level of the power supply voltage Vreg is a level considering a drop in voltage at the PMOS transistor 511 from the power supply voltage Vcc.

Further, here, the capacitance value of the capacitor 51 is set to a value of ⅓ of the capacitance value of the capacitor 54. Accordingly, out of the current Ichg (8 mA), the current Ivcc results in 2 mA and the current Ireg results in 6 mA.

In response to the power supply voltage Vcc further rising and exceeding the predetermined level Vref_vcc_off0 at time t4, the under-voltage lockout circuit 350 in FIG. 3 outputs the high signal rst_sw1 in order to start switching (i.e., cause the drive signal generator circuit 605 to operate).

Then, the drive signal generator circuit 605 outputs the driving signals Vlo, Vho to switch the NMOS transistors 24, 25. As a result, the capacitor 51 is charged with the current from the auxiliary coil La, and the power supply voltage Vcc further rises.

Further, in response to the power supply voltage Vcc rising and the voltage Vcc reaching the reference voltage Vref4 at time t5, the startup circuit 300 stops charging of the capacitor 51. Thereafter, the switching control circuit 40 switches the NMOS transistors 24, 25 such that the output voltage Vout will be the voltage of the target level.

As such, in an embodiment of the present disclosure, when the switching control circuit 40 starts up, the drive current Ireg of the regulator 500 is limited to a predetermined value (e.g., 6 mA and 30 mA). Thus, it is possible to reduce an increase in the current consumption of the regulator 500, to thereby reduce an increase in heat generation in the switching control circuit 40.

In particular, during a time period from time t1 to t2, as illustrated in FIG. 8B, the drive current Ireg of the regulator 500 is limited to a current value (e.g., 6 mA) smaller than the current Ichg. Thus, in an embodiment of the present disclosure, part of the current Ichg reliably flows to the capacitor 51, thereby being able to raise the power supply voltage Vcc.

Other Embodiments

In FIG. 5, the control circuit 520 is configured to output the voltage Vstop of the voltage Vdd_a or the ground voltage, however, the control circuit 520 may be configured to output, to the operational amplifier 510, a voltage that is generated at the variable resistor 535 and is higher than the voltage Vsel, instead of the voltage Vstop.

This enables the regulator 500 to adjust the on-resistances of the PMOS transistors 511, 530, based on the voltage higher than the voltage Vsel. As a result, the regulator 500 becomes able to adjust the current I1 not such that the supply of the current I1 is stopped or started, but such that the supply of the current I1 is reduced.

SUMMARY

The switching power supply circuit 10 according to an embodiment of the present disclosure has been described above. The switching control circuit 40 includes the drive signal generator circuit 605, the buffer 606, the regulator 500, and the control circuit 520. The switching control circuit 40 generates the drive current Ireg as well as the power supply voltage Vreg, with the built-in regulator 500. Then, the drive current Ireg is controlled, by the control circuit 520, so as to be equal to or smaller than the predetermined value. This enables provision of a switching control circuit configured to limit the current supplied by an internal regulator.

In addition, the switching control circuit 40 includes the under-voltage lockout circuit 322. The control circuit 520 changes the resistance value of the variable resistor 535, in response to the signal rst_sw0 from the under-voltage lockout circuit 322. Accordingly, it becomes possible to sufficiently charge the capacitor 51 at which a power supply voltage is generated, by limiting the drive current Ireg, when the switching control circuit 40 starts up. Further, it is possible to reduce heat generation and the like of the switching control circuit 40 by limiting the drive current Ireg, when the switching control circuit 40 is operating as well.

In addition, in response to the power supply voltage Vreg reaching the predetermined level Vref_reg_off lower than the target level, the under-voltage lockout circuit 322 stops the operation of the drive signal generator circuit 605 (described later). Accordingly, the under-voltage lockout circuit 322 reduces malfunctions of the buffers 606, 607, when the power supply voltage Vcc is high but the power supply voltage Vreg drops.

In addition, the switching control circuit 40 includes the under-voltage lockout circuit 350. In addition, in response to the power supply voltage Vcc dropping to the predetermined level Vref_vcc_off0 lower than the reference voltage Vref4, the under-voltage lockout circuit 350 stops the operation of the drive signal generator circuit 605, to thereby stop the operations of the buffers 606, 607, while allowing the regulator 500 to operate. This enables the under-voltage lockout circuit 350 to drop the current value of the drive current Ireg outputted by the regulator 500 even if the power supply voltage Vcc drops, thereby being able to prevent the power supply voltage Vreg from dropping.

In addition, the switching control circuit 40 includes the under-voltage lockout circuit 351. Further, when the power supply voltage Vcc drops to the predetermined level Vref_vcc_off1 lower than the predetermined level Vref_vcc_off0, it is conceivable that the regulator 500 may not be able to sufficiently output the power supply voltage Vreg due to a drop in the power supply voltage Vcc. Thus, the under-voltage lockout circuit 351 stops the output of the power supply voltage Vreg, and resets the switching control circuit 40. Accordingly, the under-voltage lockout circuit 351 can reduce malfunctions of the switching control circuit 40 caused by the unstable power supply voltage Vreg.

In addition, the control circuit 520 stops the regulator 500 from generating the power supply voltage Vreg, in response to the drive current Ireg reaching the predetermined value I1_limit0. This can reduce heat generation and the like of the switching control circuit 40.

In addition, the switching control circuit 40 includes the selector circuit 310. This enables the power supply circuit 320 to output the power supply voltage Vreg of the target level, based on the reference voltage selected by the selector circuit 310.

In addition, the switching control circuit 40 includes the startup circuit 300. Accordingly, when the switching power supply circuit 10 is incorporated in a power supply system, the switching control circuit 40 can generate a power supply voltage for a circuit that controls the power supply system.

In addition, the switching control circuit 40 includes the buffer 607, the startup circuit 300 includes the startup element 400 and the charge circuit 410. The buffer 607 and the startup element 400 are included in the integrated circuit 200, and circuits other than the buffer 607 and the startup element 400, of circuits included in the switching control circuit 40 are included in the integrated circuit 220. Further, the integrated circuit 200 including high withstand voltage semiconductor devices and the integrated circuit 220 including low withstand voltage semiconductor devices are manufactured in different processes. In other words, it is possible to use a process capable of manufacturing high withstand voltage semiconductor devices, when manufacturing the integrated circuit 200, and use a process of manufacturing semiconductor devices that can be highly integrated, when manufacturing the integrated circuit 220. This can reduce the manufacturing cost of the switching control circuit 40.

The present disclosure is directed to provision of a switching control circuit configured to limit a current supplied by an internal regulator.

According to the present disclosure, it is possible to provide a switching control circuit configured to limit a current supplied by an internal regulator.

Embodiments and modifications of the present disclosure described above are simply to facilitate understanding of the present disclosure and are not in any way to be construed as limiting the present disclosure. The present disclosure may variously be changed or altered without departing from its essential features and encompass equivalents thereof.

What is claimed is:

1. A switching control circuit for a switching power supply circuit, the switching power supply circuit being configured to generate an output voltage from an input voltage thereof, the switching power supply circuit including
    a first coil,
    a second coil configured to generate a voltage corresponding to a first current flowing through the first coil,
    a first switching device configured to control the first current flowing through the first coil, and
    a first capacitor configured to be charged with a second current from the second coil, to thereby generate a first power supply voltage,
the switching control circuit being configured to control switching of the first switching device,
the switching control circuit comprising:
    a drive signal generator circuit configured to generate a driving signal, based on a feedback voltage corresponding to the output voltage;
    a first driver circuit configured to switch the first switching device, in response to the driving signal;
    a regulator configured to generate
        a second power supply voltage of a target level to operate the first driver circuit, using the first power supply voltage, and
        a drive current of the first driver circuit;
    a control circuit configured to control the regulator to decrease the drive current in response to the drive current reaching a first predetermined value;
    a selector circuit configured to select a reference voltage, among a plurality of reference voltages, for causing the second power supply voltage to reach the target level, wherein
    the regulator receives the selected reference voltage and a voltage corresponding to the second power supply voltage, to thereby generate the second power supply voltage of the target level.

2. The switching control circuit according to claim 1, wherein
    the control circuit controls the regulator to decrease the drive current, by stopping the regulator from generating the second power supply voltage, in response to the drive current reaching the first predetermined value.

3. The switching control circuit according to claim 1, further comprising a startup circuit configured to charge the first capacitor.

4. The switching control circuit according to claim 3, wherein
    the switching power supply circuit further includes a second switching device configured to apply the input voltage to the first coil; and
    the switching control circuit further comprises a second driver circuit configured to operate with a voltage corresponding to the second power supply voltage, and to switch the second switching device in response to the driving signal, wherein
    the startup circuit includes
        a startup element configured to generate a charging voltage, and
        a charging circuit configured to charge the first capacitor with a current corresponding to the charging voltage, based on the first power supply voltage; and
    the switching control circuit is formed of:
        a first integrated circuit, which includes the second driver circuit and the startup element, and
        a second integrated circuit, which includes all circuits in the switching control circuit other than the second driver circuit and the startup element.

5. A switching control circuit
for a switching power supply circuit, the switching power supply circuit being configured to generate an output voltage from an input voltage thereof, the switching power supply circuit including
    a first coil,
    a second coil configured to generate a voltage corresponding to a first current flowing through the first coil,
    a first switching device configured to control the first current flowing through the first coil, and
    a first capacitor configured to be charged with a second current from the second coil, to thereby generate a first power supply voltage,
the switching control circuit being configured to control switching of the first switching device,
the switching control circuit comprising:

a drive signal generator circuit configured to generate a driving signal, based on a feedback voltage corresponding to the output voltage;
a first driver circuit configured to switch the first switching device, in response to the driving signal;
a regulator configured to generate
a second power supply voltage of a target level to operate the first driver circuit, using the first power supply voltage, and
a drive current of the first driver circuit;
a control circuit configured to control the regulator to decrease the drive current in response to the drive current reaching a first predetermined value; and
a first protection circuit configured to detect whether the second power supply voltage is higher than a first level, wherein
when the second power supply voltage is lower than the first level, the control circuit controls the regulator to decrease the drive current in response to the drive current reaching a second predetermined value, and
when the second power supply voltage is higher than the first level, the control circuit controls the regulator to decrease the drive current decreases in response to the drive current reaching the first predetermined value,
the first level is lower than the target level, and
the second predetermined value is smaller than the first predetermined value.

6. The switching control circuit according to claim 5, wherein
the first protection circuit stops an operation of the drive signal generator circuit, in response to the second power supply voltage dropping below the first level.

7. The switching control circuit according to claim 5, further comprising
a second protection circuit configured to stop an operation of the first driver circuit while allowing the regulator to operate, in response to the first power supply voltage dropping to a second level.

8. The switching control circuit according to claim 7, further comprising
a third protection circuit configured to stop the operation of the regulator, in response to the first power supply voltage dropping to a third level lower than the second level.

9. A switching power supply circuit configured to generate an output voltage from an input voltage thereof, the switching power supply circuit comprising:
a first coil;
a second coil configured to generate a voltage corresponding to a first current flowing through the first coil; and
a switching device configured to control the first current flowing through the first coil;
a capacitor configured to be charged with a second current from the second coil, to thereby generate a first power supply voltage; and
a switching control circuit configured to control switching of the switching device, the switching control circuit including
a drive signal generator circuit configured to generate a driving signal, based on a feedback voltage corresponding to the output voltage,
a driver circuit configured to switch the switching device, in response to the driving signal,
a regulator configured to generate
a second power supply voltage of a target level to operate the driver circuit, using the first power supply voltage, and
a drive current of the driver circuit,
a control circuit configured to control the regulator to decrease the drive current in response to the drive current reaching a predetermined value, and
a selector circuit configured to select a reference voltage, among a plurality of reference voltages, for causing the second power supply voltage to reach the target level, wherein
the regulator receives the selected reference voltage and a voltage corresponding to the second power supply voltage, to thereby generate the second power supply voltage of the target level.

* * * * *